United States Patent
Koch et al.

(10) Patent No.: US 7,403,600 B2
(45) Date of Patent: Jul. 22, 2008

(54) PERSON TO PERSON TELEPHONE SERVICES

(75) Inventors: Robert A. Koch, Norcross, GA (US); Gail E. White, Richardson, TX (US); Vernon Meadows, Lilburn, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 527 days.

(21) Appl. No.: 09/737,866

(22) Filed: Dec. 18, 2000

(65) Prior Publication Data

US 2004/0234061 A1  Nov. 25, 2004

(51) Int. Cl.
  *H04M 1/64* (2006.01)
(52) U.S. Cl. ............ 379/88.18; 379/88.25; 379/142.06; 379/207.16; 379/211.02; 379/215.01; 709/206
(58) Field of Classification Search ............ 379/207.02, 379/207.05–207.08, 201.05, 215.01, 211.02, 379/88.25, 88.22, 211.01, 76, 67.1, 372–372.03, 379/911, 142.02, 207.16, 221.05, 252, 201.01, 379/157, 142.06, 88.18; 370/352, 338; 709/206, 709/217; 455/463

See application file for complete search history.

(56) References Cited

U.S. PATENT DOCUMENTS

| | | | | |
|---|---|---|---|---|
| 4,899,373 | A | * | 2/1990 | Lee et al. ............... 379/201.05 |
| 4,995,075 | A | | 2/1991 | Angiolillo-Bent |
| 5,206,901 | A | | 4/1993 | Harlow |
| 5,502,762 | A | | 3/1996 | Andrew |
| 5,636,269 | A | * | 6/1997 | Eisdorfer ............... 379/215.01 |
| 5,661,791 | A | * | 8/1997 | Parker ................... 379/211.02 |
| 5,701,301 | A | | 12/1997 | Weisser, Jr. |
| 5,748,709 | A | * | 5/1998 | Sheerin .................. 379/88.22 |
| 5,799,072 | A | | 8/1998 | Vulcan |
| 5,802,160 | A | | 9/1998 | Kugell |
| 5,812,639 | A | * | 9/1998 | Bartholomew et al. ...... 370/352 |
| 5,832,221 | A | * | 11/1998 | Jones ......................... 709/206 |
| 5,838,774 | A | | 11/1998 | Weisser, Jr. |
| 5,848,142 | A | * | 12/1998 | Yaker .................... 379/215.01 |

(Continued)

OTHER PUBLICATIONS

U.S. Appl. No. 09/855,804.

(Continued)

*Primary Examiner*—Md S Elahee
(74) *Attorney, Agent, or Firm*—Scott P. Zimmerman, PLLC

(57) ABSTRACT

A method for delivering person to person services to a telephone subscriber. An embodiment of the present invention may be implemented on an Advanced Intelligent Network (AIN). A telephone number of a buddy of the subscriber is associated with a buddy rule on a buddy list. The buddy list is accessible by a service control point. When a call intended the subscriber is received by a service switching point from a calling party, a query is launched by the service switching point to the service control point. The query comprises the calling number of the calling party and the called number of the subscriber. Using the called number, the service control point retrieves and reviews the buddy list. If the calling number matches the telephone number on the buddy list, the service control point instructs the service switching point to terminate the call using the buddy rule. If the calling number does not match the telephone number on the buddy list, the service control point instructs the service switching point to terminate the call using a default rule.

4 Claims, 10 Drawing Sheets

U.S. PATENT DOCUMENTS

| | | | |
|---|---|---|---|
| 5,857,017 A * | 1/1999 | Ohi et al. | 379/157 |
| 5,898,769 A * | 4/1999 | Furman | 379/221.05 |
| 5,926,537 A * | 7/1999 | Birze | 379/252 |
| 5,956,394 A * | 9/1999 | Andruska et al. | 379/201.01 |
| 6,026,156 A * | 2/2000 | Epler et al. | 379/215.01 |
| 6,097,719 A * | 8/2000 | Benash et al. | 370/352 |
| 6,141,341 A | 10/2000 | Jones | |
| 6,185,285 B1 | 2/2001 | Relyea et al. | |
| 6,226,359 B1 * | 5/2001 | Montgomery et al. | 379/67.1 |
| 6,275,576 B1 * | 8/2001 | Urban et al. | 379/207.02 |
| 6,301,608 B1 * | 10/2001 | Rochkind | 709/206 |
| 6,317,781 B1 * | 11/2001 | De Boor et al. | 709/217 |
| 6,424,702 B1 * | 7/2002 | Blumenschein et al. | 379/67.1 |
| 6,434,394 B1 * | 8/2002 | Grundvig et al. | 455/463 |
| 6,650,746 B1 * | 11/2003 | Groen et al. | 379/207.16 |
| 6,718,026 B1 * | 4/2004 | Pershan et al. | 379/211.01 |
| 6,751,299 B1 * | 6/2004 | Brown et al. | 379/88.18 |
| 6,795,530 B1 * | 9/2004 | Gilbert et al. | 379/76 |
| 6,882,708 B1 * | 4/2005 | Bedingfield et al. | 379/88.18 |
| 7,020,255 B2 * | 3/2006 | Gruchala et al. | 379/142.02 |
| 2002/0080751 A1 * | 6/2002 | Hartmaier | 370/338 |
| 2004/0151294 A1 * | 8/2004 | Baniak et al. | 379/211.01 |

OTHER PUBLICATIONS

U.S. Appl. No. 09/849,971.

* cited by examiner

PERSON TO PERSON TELEPHONE SERVICES

BACKGROUND

1. Field of the Invention

The present invention relates to telecommunications, and more particularly, to a system and method for providing person to person (PTP) telephone services.

2. Background of the Invention

Using the telephone to communicate has become an important aspect of our lives. As a result, almost every family in an industrialized nation has a telephone line. On a daily basis, a typical family may receive a large number of telephone calls. The number of incoming calls could be even larger if the family has become a target customer of a telemarketing campaign. A telephone user may find it annoying to have answered a call not intended for him or her, especially when the call is from an unknown person such as a telemarketing representative.

In addition to avoiding calls from calling parties who are unknown to any member of the family, a telephone user may prefer not to answer a call unless he or she knows specifically that the call is intended for him or her. For example, in a multi-member family comprising a father, a mother, and a son, friends and relatives the father may want to answer calls from only a small of number of his "buddies". He does not even want to answer calls intended for the wife or the son.

The annoyance of answering calls from unknown calling parties could be aggravated in a call waiting situation. For example, the father could be extremely annoyed when he must temporary put a first call on hold to answer a second call, only to find out the second call is from a telemarketing company.

To avoid answering telephone unwanted or unwelcome calls, a number of solutions have been used. The first solution involves the use of an answering machine. A person using this method decides whether to answer a call when the calling party identifies himself or herself following a greeting played by the answering machine. This solution is effective in screening out undesirable calls. However, the solution also creates a new problem when many calling parties, especially those from whom the person wishes to receive calls, simply hang up as soon as the greeting is played by the answering machine, resulting in fewer communication opportunities between the calling parties and the person. In addition, this solution does not solve the call waiting problem.

A second solution requires the subscription of a service commonly known as the Caller ID service. A telephone service subscriber with the Caller ID service subscription has a device that displays the identity of the calling party. The identity may be the name and/or the telephone number of the calling party. The identity of the calling party may be displayed on the device in alphanumeric characters. Although this solution is arguably better than the first solution, a number of disadvantages exist. For example, the solution still requires the subscriber to review what is displayed on the Caller ID device before deciding whether to answer the incoming call. Like the first solution, the second solution does not solve the call waiting problem.

A third solution involves the installation of multiple telephone lines. For example, each member of a multi-member family has his or her own telephone line. The multiple telephone lines must be adapted to alert associated telephone sets with distinctive ringing tones to enable the members to know whose line is ringing. Although this solution can, to some extent, solve the problems described above, the solution can be expensive. Having multiple telephone lines for one family may not be an affordable luxury for most people.

SUMMARY OF THE INVENTION

The present invention is a system and method for providing PTP telephone services. Examples of existing telephone services that can benefit from the present invention include distinctive ringing, mailbox routing, call waiting, and call forwarding.

A subscriber of the present invention may be an individual person. The subscriber may also be multi-member entity. For example, the subscriber may be a three-member family. All three members of the family may share one telephone line. The telephone number associated with the telephone line of the subscriber is hereinafter referred to as the subscriber number.

The present invention can be implemented in any suitable telephone systems or networks. For example, the invention may be adapted for an Advanced Intelligent Network (AIN). In an AIN, a preferred embodiment of the system of the present invention can comprise a service switching point (SSP) and a service control point (SCP). The SSP is connected to the telephone line of the subscriber. In an exemplary embodiment, the SSP may be provisioned with a trigger. The trigger can detect a condition at the SSP to cause the SSP to generate a query to the SCP. The SCP can then use information contained in the query retrieve and review a subscriber list that is associated with the subscriber number. The subscriber list may be known as the "buddy list" of the subscriber. The buddy list may be retrieved by the SCP from a database.

The buddy list can contain information related to one or more "buddies" of the subscriber. A buddy is a person who has been identified by the subscriber as a potential calling party from whom the subscriber wishes to receive calls. Each buddy may be associated with a "buddy number" on the buddy list. The buddy number may be the telephone number of the buddy.

For each buddy, the buddy list can further comprise one or more buddy rules. A buddy rule can be a call processing instruction. The SCP can follow a buddy rule in its response to the query received from the SSP.

In a preferred embodiment, the buddy list can be modified by the subscriber at any time. For example, the subscriber may add, delete, or otherwise edit the information on the buddy list via a computer network. In an exemplary embodiment, the subscriber can edit the buddy list via the Internet.

A method for using the present invention on the AIN may comprise the following steps. First, a buddy list associated with a subscriber number can be created. The buddy list may contain one or more buddy numbers of the subscriber's buddies. Each buddy number on the buddy list may be associated with one or more buddy rules. Second, the buddy list may be stored in a database. The database can be accessible by an SCP.

Third, one or more triggers may be provisioned at the SSP that serves the telephone line of the subscriber. A termination attempt trigger or a terminating busy/no answer trigger may be used to detect incoming calls intended for the subscriber. An off-hook immediate or an off-hook delay trigger may be used to detect out-going calls placed by the subscriber.

Fourth, when a call is received at the SSP, e.g., a caller or a calling party has dialed the telephone number of the subscriber (the subscriber number), the call is detected by a trigger. As a result, the SSP launches a query to the SCP. The query may comprise, among other information, the subscriber number and the calling number (which is the telephone number of the calling party).

Fifth, the SCP then uses the subscriber number to retrieve the buddy list. Sixth, using the calling number, the SCP determines whether the calling party is a buddy of the subscriber. If the calling party is not a buddy, i.e., the calling number does not match any of the buddy numbers on the buddy list, the SCP may instruct the SSP to terminate the call using a default rule. The default rule may be to ring the subscriber's telephone using a standard ringing tone. But if the calling party is a buddy, i.e., the calling number matches a buddy number on the buddy list, the SCP can instruct the SSP to terminate the call in accordance with a buddy rule that is associated with the buddy number. The buddy rule may be to ring the subscriber's telephone using a distinctive ringing tone.

A number of buddy rules may be used depending on the feature or features of PTP services available to the subscriber. Specific examples of PTP services include Buddy Ring Service, Buddy Mailbox Service, Buddy Call Waiting Service, and Buddy Call Forwarding Service. The Buddy Ring Service provides a distinctive ringing tone when the calling party is a buddy. For a multi-member subscriber, each member may be associated with a distinctive ringing tone. The Buddy Mailbox Service channels a call from a buddy to an appropriate buddy mailbox that is associated with the buddy number on the buddy list. The Buddy Call Waiting Service alerts the subscriber who is engaged in a first call about a second call when the second call is from a buddy. The Buddy Call Forwarding Service routes a call from a buddy to a forwarding telephone number found in the buddy list without ever alerting the subscriber's telephone line.

Accordingly, is an object of the invention to provide flexibility to telephone service subscribers to manage their telephone calls.

It is another object of the invention to enable each member of a multi-member subscriber to enjoy the benefits associated with multiple telephone lines with only one telephone line.

These and other objects of the present invention are described in greater detail in the detailed description of the invention, the appended drawings, and the attached claims.

DETAILED DESCRIPTION OF PREFERRED EMBODIMENTS

The present invention may be adapted for any telephone systems or networks. For example, the present invention may be adapted for a wireless network. For illustration purposes, the following preferred embodiments are adapted for an AIN. The AIN is described in U.S. Pat. Nos. 5,701,301, and 5,838,774, which are hereby incorporated by reference in their entirety.

Figure 1:
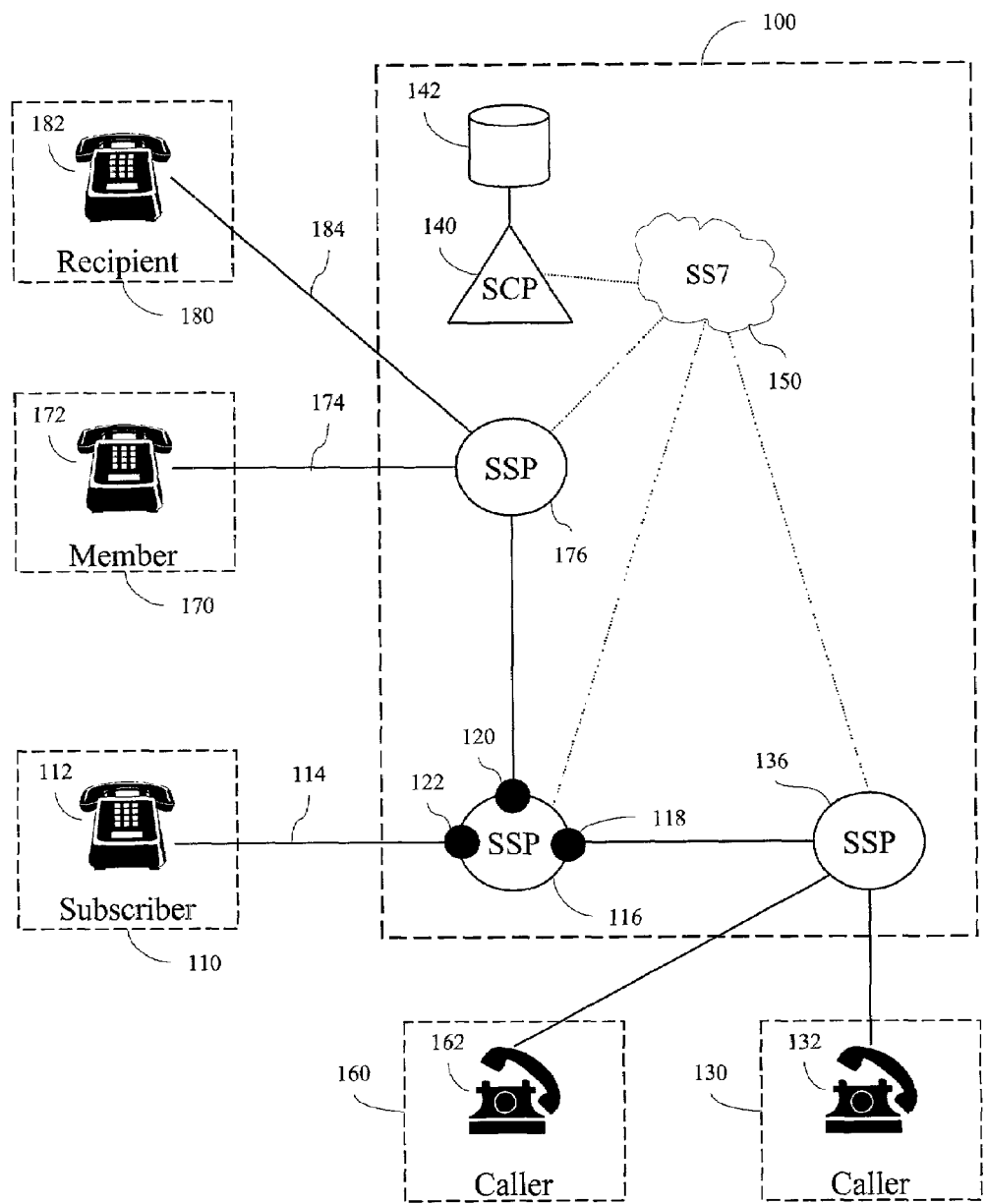
FIG. 1 is a schematic diagram showing the system architecture of embodiment of the present invention.

FIG. 1 is a schematic diagram showing an embodiment of the system architecture of the present invention. Telephone network 100 may be the AIN. Subscriber 110 is a customer or service subscriber of the present invention. Telephone network 100 may be the service provider of the present invention. Subscriber 110 may be an individual subscriber or a multi-member subscriber.

Subscriber 110 has customer premises equipment (CPE) 112. CPE 112 may be a telephone set. Subscriber 110 may use CPE 112 to effect communication sessions through telephone line 114. The telephone number associated with telephone line 114 may be hereinafter referred to as the subscriber number. Telephone line 114 is connected to SSP 116.

One or more triggers associated with telephone line 114 may be provisioned on SSP 116. For example, trigger 118 may be a termination attempt trigger. Trigger 120 may be a terminating busy/no answer trigger. Trigger 122 may be an off-hook immediate trigger or an off-hook delay trigger. Trigger 122 detects an off-hook condition of telephone line 114. For example, when subscriber 110 picks up the handset of CPE 112, an off-hook condition is detected. The off-hook condition may also be detected after subscriber 110 dials the telephone number of recipient 180. Recipient 180 is associated with telephone line 184 and CPE 182.

Trigger 118 and trigger 120 can detect incoming calls intended for subscriber 110. For example, when caller 130 uses CPE 132 to dial the subscriber number, one or both of triggers 118 and 120 may detect the call. Although caller 130 is shown to be connected to SSP 136, it is understood that in some circumstances caller 130 could be directly connected to SSP 116. Similarly, calls from caller 160 who uses CPE 162 to dial the subscriber number can be detected by one or both of triggers 118 and 120.

The detection of an incoming call by trigger 118 or trigger 120 can cause SSP 116 to launch a query. Similarly, the detection of an off-hook condition by trigger 122 can also cause SSP 116 to launch a query. The query launched by SSP 116 may be sent to SCP 140 over the AIN's SS7 network 150. The query may comprise the subscriber number in the Called_Party_ID field of the query. In addition, the query may comprise a calling number in the Calling_Party_ID field. The calling number is the telephone number of a caller who dials the subscriber number.

SCP 140 then uses the subscriber number to access subscriber information associated with subscriber 110. The subscriber information may be stored in database 142. The subscriber information may comprise a subscriber list or a buddy list.

Using the calling number, SCP 140 retrieves one or more call processing instructions from the buddy list. The call processing instructions may be referred to as buddy rules. The buddy rules are then used to generate a response to the query. SSP 116 can then use the response to process the call from the caller.

Transmission of the query from SSP 116 to SCP 140 and the response from SCP 140 to SSP 116 may be done using signaling. Signaling of the query and the response may be done using signaling system 150. Preferably, signaling system 150 is the well-known SS7, as shown in FIG. 1.

One member of subscriber 110 may have an additional telephone line. For example, member 170 of subscriber 110 may have telephone line 174 and CPE 172. Telephone line 174 is connected to SSP 176. The telephone number associated with telephone line 174 is hereinafter referred to as the forwarding telephone number.

Figure 2:
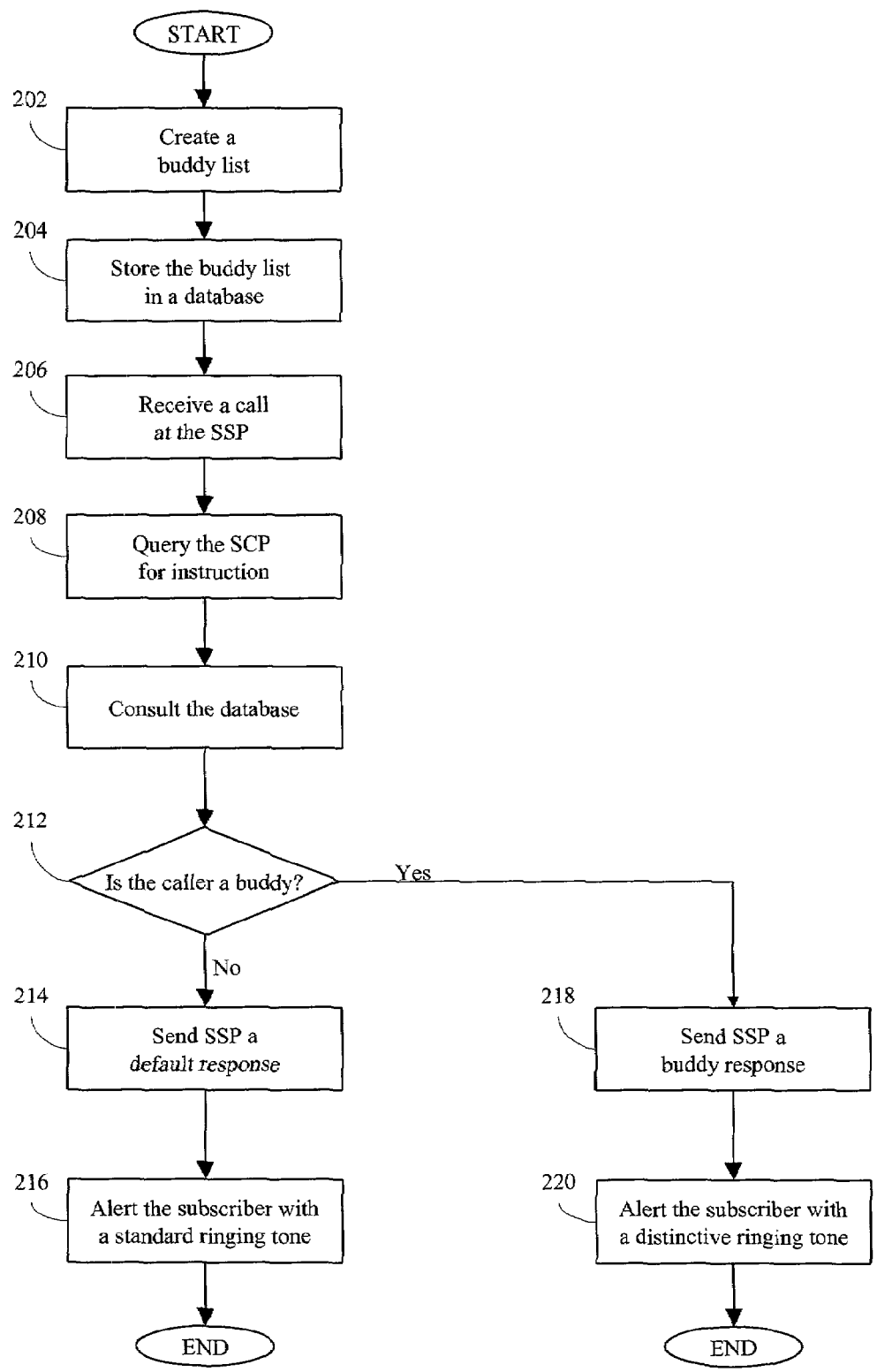
FIG. 2 is a flowchart illustrating the steps involved in using the first preferred embodiment of the present invention that may be known as the Buddy Ring Service.

FIG. 2 is a flowchart illustrating the steps involved in using the first preferred embodiment of the present invention that may be known as the Buddy Ring Service. With the Buddy Ring Service, each member of a multi-member subscriber can know whether an incoming call is for him or her. For example, each member of subscriber 110 shown in FIG. 1 may be associated with a unique or distinctive ringing tone. When a call is received from a buddy of a specific member, that member's distinctive ringing tone will be used to alert CPE 112. In a situation in which subscriber 110 is an individual subscriber, each buddy of subscriber 110 may be associated with a distinctive ringing tone. The present invention uses a single telephone line to provide more than one ringing tone to alert its subscriber. The present invention is therefore different from an existing distinctive ringing service that requires at least two telephone lines.

In step 202, the buddy list associated with subscriber 110 is created. The buddy list may be created by subscriber 110. The buddy list may be uploaded or provided to the service provider of the present invention via, e.g., the Internet. The buddy list may be associated with the telephone number of telephone line 114. The telephone number of telephone line 114 may be referred to as the subscriber number. As a specific example, assume that the subscriber number is 404-828-0000. Each member of subscriber 110 may have his or her own buddy list. For example, if subscriber 110 has three members, namely, John Smith, Jane Smith, and Billy Smith, then three buddy lists may be created for subscriber 110. Tables 1 through 3 below are specific examples of buddy lists of John, Jane, and Billy, respectively.

TABLE 1

Buddy List of John Smith (Subscriber Number 404-828-0000)

| Calling Party (Buddy) Number | Calling Party (Buddy) | Distinctive Ringing Tone |
|---|---|---|
| 404-821-1000 | Sammy Johnson | No. 1 |
| 770-529-1234 | Bo Bedingfield | No. 1 |
| 678-352-2121 | Mike Brown | No. 1 |

TABLE 2

Buddy List of Jane Smith (Subscriber Number 404-828-0000)

| Calling Party (Buddy) Number | Calling Party (Buddy) | Distinctive Ringing Tone |
|---|---|---|
| 205-449-0000 | Mary Jo Jackson | No. 2 |
| 770-234-4545 | Rebecca Whitehead | No. 2 |
| 630-657-9012 | Irene Green | No. 2 |

TABLE 3

Buddy List of Billy Smith (Subscriber Number 404-828-0000)

| Calling Party (Buddy) Number | Calling Party (Buddy) | Distinctive Ringing Tone |
|---|---|---|
| 704-449-0000 | Bob Jones | No. 3 |
| 919-234-4545 | Freddie Cooper | No. 3 |
| 212-565-8902 | Jason Baker | No. 3 |

As it is understood by one skilled in the art, Tables 1 through 3 may be consolidated as a single buddy list shown as Table 4 below.

TABLE 4

Buddy List of the Smith Family (Subscriber Number 404-828-0000)

| Calling Party (Buddy) Number | Calling Party (Buddy) | Distinctive Ringing Tone |
|---|---|---|
| 404-821-1000 | Sammy Johnson | No. 1 |
| 770-529-1234 | Bo Bedingfield | No. 1 |
| 678-352-2121 | Mike Brown | No. 1 |
| 205-449-0000 | Mary Jo Jackson | No. 2 |
| 770-234-4545 | Rebecca Whitehead | No. 2 |
| 630-657-9012 | Irene Green | No. 2 |
| 704-449-0000 | Bob Jones | No. 3 |
| 919-234-4545 | Freddie Cooper | No. 3 |
| 212-565-8902 | Jason Baker | No. 3 |

In step 204, the buddy list may be stored in a database. For example, Table 4 above may be stored in database 142 shown in FIG. 1.

In step 206, when caller 130 dials the subscriber number, the call is routed to SSP 116. At SSP 116, the call can be detected by trigger 118. As discussed above, trigger 118 may be a termination attempt trigger.

In step 208, SSP 116 launches a query to SCP 140. The query may be a Transactional Capabilities Application Part (TCAP) query. For example, the query may be a Termination_Attempt query. The query may contain, among other information, the telephone number of caller 130 in the Calling_Party_ID field and the subscriber number in the Called_Party_ID field.

In step 210, SCP 140 consults database 142. Using the information in the Called_Party_ID field of the query, SCP 140 may access the buddy list of subscriber 110. For example, using "404-828-0000," SCP 140 can retrieve Table 4 shown above.

In step 212, SCP 140 may use the information in the Calling_Party_ID field of the query to determine whether caller 130 is a buddy of subscriber 110. For example, if caller 130 is a telemarketing representative who is not a buddy of subscriber 110, SCP 140 will not find a matching calling party number on the buddy list. On the other hand, if caller 130 is Sammy Johnson whose telephone number is 404-821-1000, SCP 140 will recognize 404-821-1000 as a buddy number on the buddy list.

If in step 212 it is determined that caller 130 is not a buddy, the process goes to step 214. In step 214, SCP 140 sends a default response to SSP 116. The default response may contain an Authorize_Termination message with a default rule. The default rule may comprise an instruction for SSP 116 to ring CPE 112 with a standard ringing tone. In step 216, SSP 116 executes the default rule. In other words, SSP 116 rings CPE 112 with a standard ringing tone that indicates that caller 130 is not a buddy of subscriber 110.

But if in step 212 it is determined that caller 130 is a buddy, e.g., Sammy Johnson had dialed 404-828-0000, the process goes to step 218. In step 218, SCP 140 may send SSP 116 with a buddy response. The buddy response can contain a buddy rule obtained from the buddy list. For example, the buddy rule may be to ring CPE 112 of subscriber 110 with a distinctive ringing tone that is associated with the buddy number. For example, since the distinctive ringing tone associated with buddy number 404-821-1000 in Table 4 is Distinctive Ringing Tone No. 1, SSP 116 will ring CPE 112 with Distinctive Ringing Tone No. 1 in step 220. Similarly, if caller 130 were Jason Baker instead, Distinctive Ringing Tone No. 3 associated with buddy number 212-565-8902 will be used to alert CPE 112, indicating a buddy of Billy Smith is calling. The distinctive ringing tone number may be contained in the response in a dedicated field. For example, the response may have a ControllingLegTreatment field to carry the distinctive ringing tone type.

Figure 3:
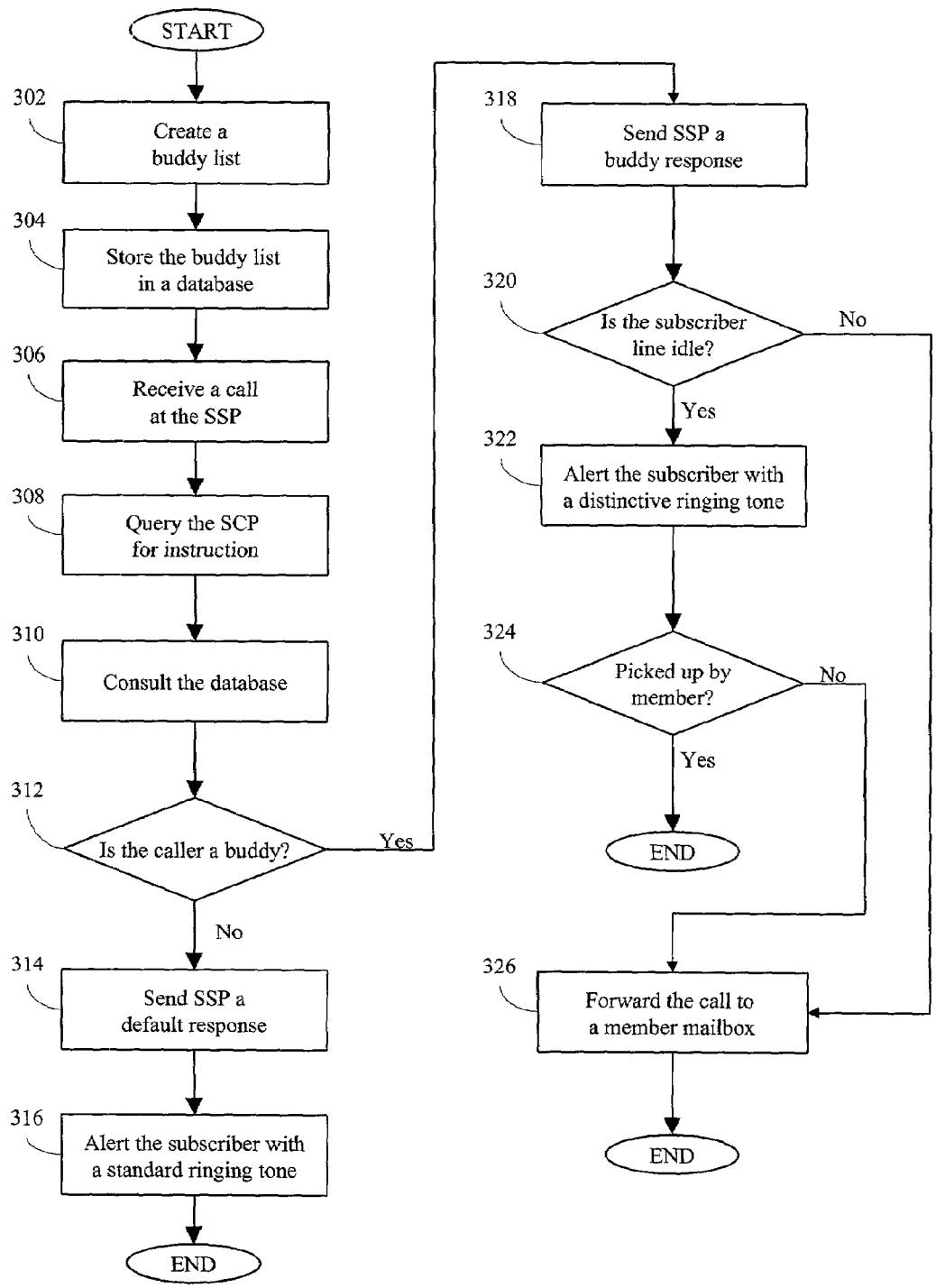
FIG. 3 is a flowchart illustrating the steps involved in using a second preferred embodiment of the present invention that may be known as the Buddy Mailbox Service.

FIG. 3 is a flowchart illustrating the steps involved in using the second preferred embodiment of the present invention that may be known as the Buddy Mailbox Service. In this embodiment, a call from a buddy of the subscriber can be routed to a buddy mailbox of the subscriber when the subscriber does not answer the call.

Steps 302 through 316 of this embodiment may be similar to corresponding steps 202 through 216 shown in FIG. 2 and described above. However, the buddy list of this embodiment may contain additional information. An example of a buddy list for this embodiment is shown as Table 5 below.

TABLE 5

Buddy List of the Smith Family
(Subscriber Number 404-828-0000)

| Calling Party (Buddy) Number | Calling Party (Buddy) | Distinctive Ringing Tone | Member Mailbox Number |
|---|---|---|---|
| 404-821-1000 | Sammy Johnson | No. 1 | 001 |
| 770-529-1234 | Bo Bedingfield | No. 1 | 001 |
| 678-352-2121 | Mike Brown | No. 1 | 001 |
| 205-449-0000 | Mary Jo Jackson | No. 2 | 002 |
| 770-234-4545 | Rebecca Whitehead | No. 2 | 002 |
| 630-657-9012 | Irene Green | No. 2 | 002 |
| 704-449-0000 | Bob Jones | No. 3 | 003 |
| 919-234-4545 | Freddie Cooper | No. 3 | 003 |
| 212-565-8902 | Jason Baker | No. 3 | 003 |

In step 318, SCP 140 sends a buddy response to SSP 116. The buddy response may comprise a Called_Party_ID field with thirteen digits. The first three digits may be an appropriate member mailbox number. For example, if caller 130 is Sammy Johnson, the Called_Party_ID field may contain "001-404-828-0000", indicating that John's mailbox should be used. Similarly, the Called_Party_ID field can contain "002" as the first three digits if caller 130 were Rebecca Whitehead, who is a buddy of Jane Smith.

In step 320, when the buddy response arrives at SSP 116, the buddy response bypasses trigger 118 to encounter trigger 120. Trigger 120 may be a terminating busy/no answer trigger. In step 320, if telephone line 114 has an idle status, i.e., telephone line 114 is not being used in a communication session, the process goes to step 322. In step 322, SSP 116 alerts CPE 112 with a distinctive ringing tone that is associated with the buddy number of caller 130.

In step 324, SSP 116 may continue to ring CPE 112 for a specific amount of time. For example, SSP 116 may be programmed to ring CPE 112 for a predetermined number of rings. If the call is not picked up by any person after the specific amount of time has elapsed, the call is forwarded, in step 326, to an appropriate member mailbox. For example, if caller 130 is a buddy of John, the call can be forwarded to John's mailbox based on the information in the Member_Mailbox field of the response. Similarly, a call from a buddy of Jane will be forwarded to Jane's mailbox, and a call from Billy's buddy will be routed to Billy's mailbox.

But if in step 320 it is determined that telephone line 114 is busy, i.e., it is being used for a communication session, the process goes to step 326 directly.

As it is understood by one skilled in the art, the process in steps 320 through 326 may involve additional signaling between SSP 116 and SCP 140. For example, if it is determined in step 320 that telephone line 114 has a busy status, a second query may be launched by SSP 116 to SCP 140. The second query may be a Terminating_Busy/No Answer query, informing SCP 140 that telephone line 114 is busy. In response to the second query, SCP 140 may send to SSP 116 a second buddy response. The second buddy response may be a Forward_Call message. The second response may contain information indicating the appropriate mailbox for SSP 116 to forward the call to.

Figure 4:
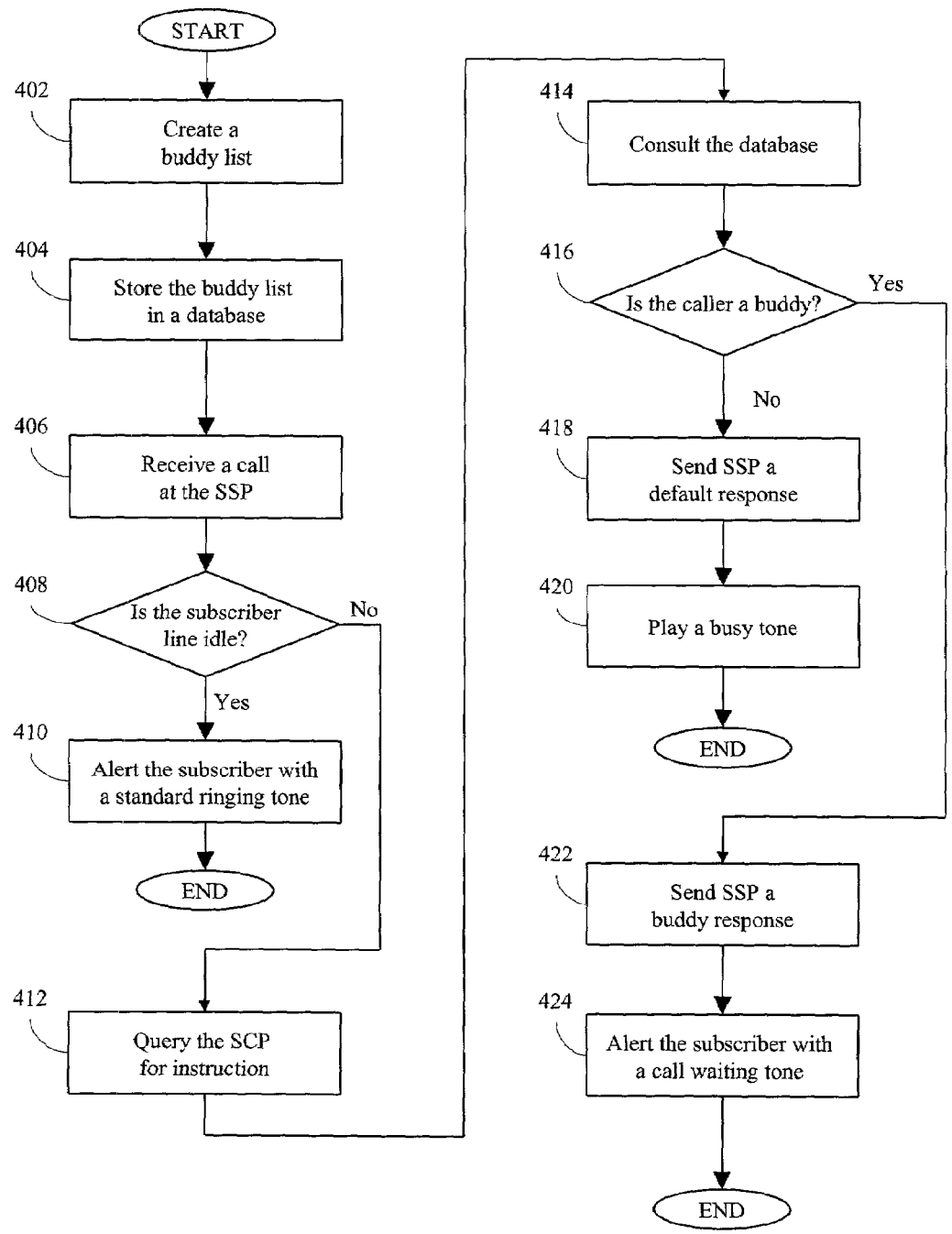
FIG. 4 is a flowchart illustrating the steps involved in using a third preferred embodiment of the present invention that may be known as the Buddy Call Waiting Service.

FIG. 4 is a flowchart illustrating the steps involved in using the third preferred embodiment of the present invention that may be known as the Buddy Call Waiting Service. In this embodiment, a call from a buddy may be alerted to the subscriber when the subscriber is already engaged with another call. If the caller is not a buddy, the caller may hear a busy tone.

Steps 402 through 404 of this embodiment may be similar to corresponding steps 202 through 204 shown in FIG. 2 and described above. However, the buddy list of this embodiment may contain different information. An example of a buddy list for this embodiment is shown as Table 6 below.

TABLE 6

Buddy List of the Smith Family
(Subscriber Number 404-828-0000)

| Calling Party (Buddy) Number | Calling Party (Buddy) | Distinctive Ringing Tone | Call Waiting Tone |
|---|---|---|---|
| 404-821-1000 | Sammy Johnson | No. 1 | Standard |
| 770-529-1234 | Bo Bedingfield | No. 1 | Standard |
| 678-352-2121 | Mike Brown | No. 1 | Standard |
| 205-449-0000 | Mary Jo Jackson | No. 2 | Standard |
| 770-234-4545 | Rebecca Whitehead | No. 2 | Standard |
| 630-657-9012 | Irene Green | No. 2 | Standard |
| 704-449-0000 | Bob Jones | No. 3 | Standard |
| 919-234-4545 | Freddie Cooper | No. 3 | Standard |
| 212-565-8902 | Jason Baker | No. 3 | Standard |

In step 406, when an incoming call from caller 130 arrives at SSP 116, the call is detected by trigger 120. Trigger 120 may be a terminating busy/no answer trigger. Trigger 118 is not a necessary component in this embodiment. In step 408, if telephone line 114 of subscriber 110 is idle, i.e., it is available to accept the call, the process goes to step 410. In step 410, CPE 112 may ring with a standard ringing tone.

But if in step 408 telephone line 114 is determined to have a busy status, i.e., someone is using telephone line 114, the process goes to step 412. In step 412, SSP 116 launches a query to SCP 140. The query may be a Terminating Busy/No Answer query.

In step 414, SCP 140 may consult the buddy list in database 142. In step 416, if caller 130 is determined not to be a buddy, the process goes to step 418. In step 418, SCP 140 sends a default response to SSP 116. The default response may contain an Authorize_Termination message with a default rule. The default rule may comprise an instruction for SSP 116 to play a busy tone for caller 130. In step 420, SSP 116 executes the default rule and caller 130 hears a busy tone, indicating subscriber 110 is not available to receive the call.

But if it is determined in step 416 that caller 130 is a buddy, the process goes to step 422. In step 422, SCP 140 sends a buddy response to SSP 116. The buddy response may be an Authorize_Termination message. The buddy response may also comprise a ControllingLegTreatment field. The ControllingLegTreatment field may contain a standard call waiting tone indication. In step 424, SSP 116 alerts subscriber 110 with the standard calling waiting tone.

Figure 5:
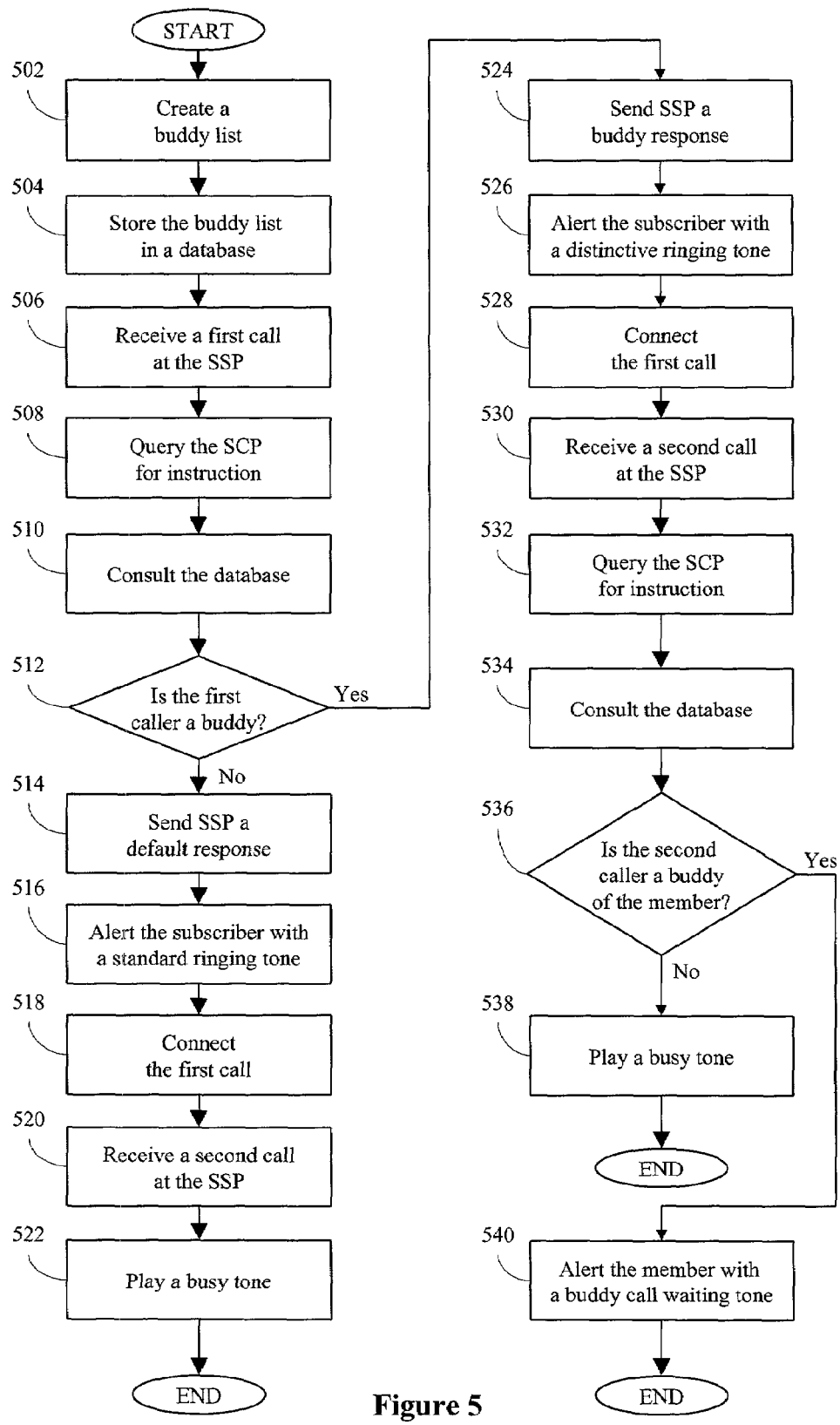
FIG. 5 is a flowchart illustrating the steps involved in using a fourth preferred embodiment of the present invention that may be known as the Deluxe Buddy Call Waiting Service.

FIG. 5 is a flowchart illustrating the steps involved in using the fourth preferred embodiment of the present invention that may be known as the Deluxe Buddy Call Waiting Service. In this embodiment, a call from a buddy of a member of a multi-member subscriber results in a call waiting tone if the person who is on the subscriber's telephone is the member associated with the buddy. In other words, unless the caller is a buddy of the member who is on the telephone, the call waiting tone may not be used to alert the member that he has a telephone call.

In step 502, the buddy list associated with subscriber 110 is created. For this embodiment, the buddy list may be represented as Table 7 below.

TABLE 7

Buddy List of the Smith Family
(Subscriber Number 404-828-0000)

| Calling Party (Buddy) Number | Calling Party (Buddy) | Distinctive Ringing Tone | Buddy Call Waiting Tone | PIN |
| --- | --- | --- | --- | --- |
| 404-821-1000 | Sammy Johnson | No. 1 | A | 101 |
| 770-529-1234 | Bo Bedingfield | No. 1 | A | 101 |
| 678-352-2121 | Mike Brown | No. 1 | A | 101 |
| 205-449-0000 | Mary Jo Jackson | No. 2 | B | 202 |
| 770-234-4545 | Rebecca Whitehead | No. 2 | B | 202 |
| 630-657-9012 | Irene Green | No. 2 | B | 202 |
| 704-449-0000 | Bob Jones | No. 3 | C | 303 |
| 919-234-4545 | Freddie Cooper | No. 3 | C | 303 |
| 212-565-8902 | Jason Baker | No. 3 | C | 303 |

As shown in Table 7, each buddy of the subscriber may be associated with a buddy call waiting tone. In addition, each member of the subscriber may be associated with a personal identification number (PIN). In the specific example shown in the buddy list of the Smith family, the call waiting tones for John, Jane, and Billy are Calling Waiting Tones A, B, and C, respectively. The PINs for John, Jane, and Billy are 101, 202, and 303, respectively.

In step 504, the buddy list may be stored in a database. For example, Table 7 above may be stored in database 142 shown in FIG. 1.

In step 506, when caller 130 dials the subscriber number, a first call is received by SSP 116. At SSP 116, the first call can be detected by trigger 118. As discussed above, trigger 118 may be a termination attempt trigger.

In step 508, SSP 116 launches a query to SCP 140. The query may be a TCAP query. For example, the query may be a Termination_Attempt query. The query may contain, among other information, the telephone number of caller 130 in the Calling_Party_ID field and the subscriber number in the Called_Party_ID field.

In step 510, SCP 140 consults database 142. Using the information in the Called Party_ID field of the query, SCP 140 may access the buddy list of subscriber 110. For example, using "404-828-0000," SCP 140 can retrieve Table 7 shown above.

In step 512, SCP 140 may use the information in the Calling_Party_ID field of the query to determine whether caller 130 is a buddy of subscriber 110. For example, if caller 130 is a telemarketing representative who is not a buddy of subscriber 110, SCP 140 will not find a matching buddy number on the buddy list. On the other hand, if caller 130 is Sammy Johnson whose calling number is 404-821-1000, SCP 140 will find a match on the buddy list.

If caller 130 is not a buddy, the process goes to step 514. In step 514, SCP 140 sends a default response to SSP 116. The default response may contain an Authorize_Termination message with a default rule. The default rule may comprise an instruction for SSP 116 to ring CPE 112 with a standard ringing tone. In step 516, SSP 116 executes the default rule. In other words, SSP 116 rings CPE 112 with the standard ringing tone, indicating that caller 130 is not a buddy of subscriber 110.

In step 518, when a person answers the first call using CPE 112, SSP 116 connects the first call, establishing a communication session between the person and caller 130. The identity of the person who answers the first call is not known by the system. The person may be John, Jane, or Billy. The person may even be anyone else who answers the first call using CPE 112.

While the person is on the telephone with caller 130, caller 160 may dial the subscriber number and a second call for telephone line 114 is received at SSP 116 in step 520. The second call may be detected by trigger 120. Trigger 120 may be a terminating busy/no answer trigger. SSP 116 may then launch a Terminating Busy/No Answer query to SCP 140. Since the identity of the person is not known to the system, SSP 116 may be instructed by SCP 140 to play a busy tone, in step 522, to inform caller 160 that telephone line 114 is not available.

But if in step 512 it is determined that caller 130 is a buddy, e.g., Sammy Johnson had dialed 404-828-0000, the process goes to step 524. In step 524, SCP 140 may send SSP 116 a buddy response. The buddy response can contain a buddy rule obtained from the buddy list. For example, the buddy rule may be to ring CPE 112 of subscriber 110 with a distinctive ringing tone that is associated with the buddy number. For example, since the distinctive ringing tone associated with buddy number 404-821-1000 in Table 7 is Distinctive Ringing Tone No. 1, SSP 116 rings CPE 112 with Distinctive Ringing Tone No. 1 in step 526. A ControllingLegTreatment field may be used to contain the distinctive ringing tone type. SCP 140 can then maintain a record indicating which distinctive ringing tone was played.

In step 528, a member recognizes the distinctive ringing tone and answers the first call. For example, when John Smith recognizes that the distinctive ringing tone played by CPE 112 is the tone associated with him, he answers the first call. The first call is then connected between a member and caller 130. In this example, the system knows the identity of the member who is using telephone line 114 to communicate with caller 130 because SCP140 had previously stored the distinctive ringing tone associated with the first call. In this case John Smith is the member.

While the member is on the telephone with caller 130, caller 160 may dial the subscriber number and a second call for telephone line 114 is received at SSP 116 in step 530. The second call may be detected by trigger 120. Trigger 120 may be a terminating busy/no answer trigger. SSP 116 then launches a Terminating Busy/No Answer query to SCP 140. The Terminating Busy/No Answer query may contain, among other information, the telephone number of caller 160 in the Calling_Party_ID field and the subscriber number in the Called_Party_ID field.

In step 534, SCP 140 consults database 142. Using the information in the Called Party_ID field of the query, SCP 140 may access the buddy list of subscriber 110. For example, using "404-828-0000," SCP 140 can retrieve Table 7 shown above.

In step 536, SCP 140 may use the information in the Calling_Party_ID field of the query, in addition to the indication of which member is engaged with caller 130, to determine whether caller 160 is a buddy of the member. For example, if caller 160 is not a buddy of the member, SCP 140 will instruct SSP 116, via a response to the second query, to play a busy tone for caller 160 in step 538.

But if it is determined in step 536 caller 160 is a buddy of the member. For example, the member who is on the first call is John Smith and caller 160 is Bo Bedingfield, a buddy of John, the process goes to step 540. In step 540, SCP 140 may instruct SSP 116 to play a call waiting tone that is associated with the member. In the example in which John Smith is the member, Buddy Call Waiting Tone A would be played by SSP 116 in step 540. The buddy call waiting tone may be supplied in the Call_Waiting_Tone field of the response from SCP 140 to SSP 116.

Figure 6:
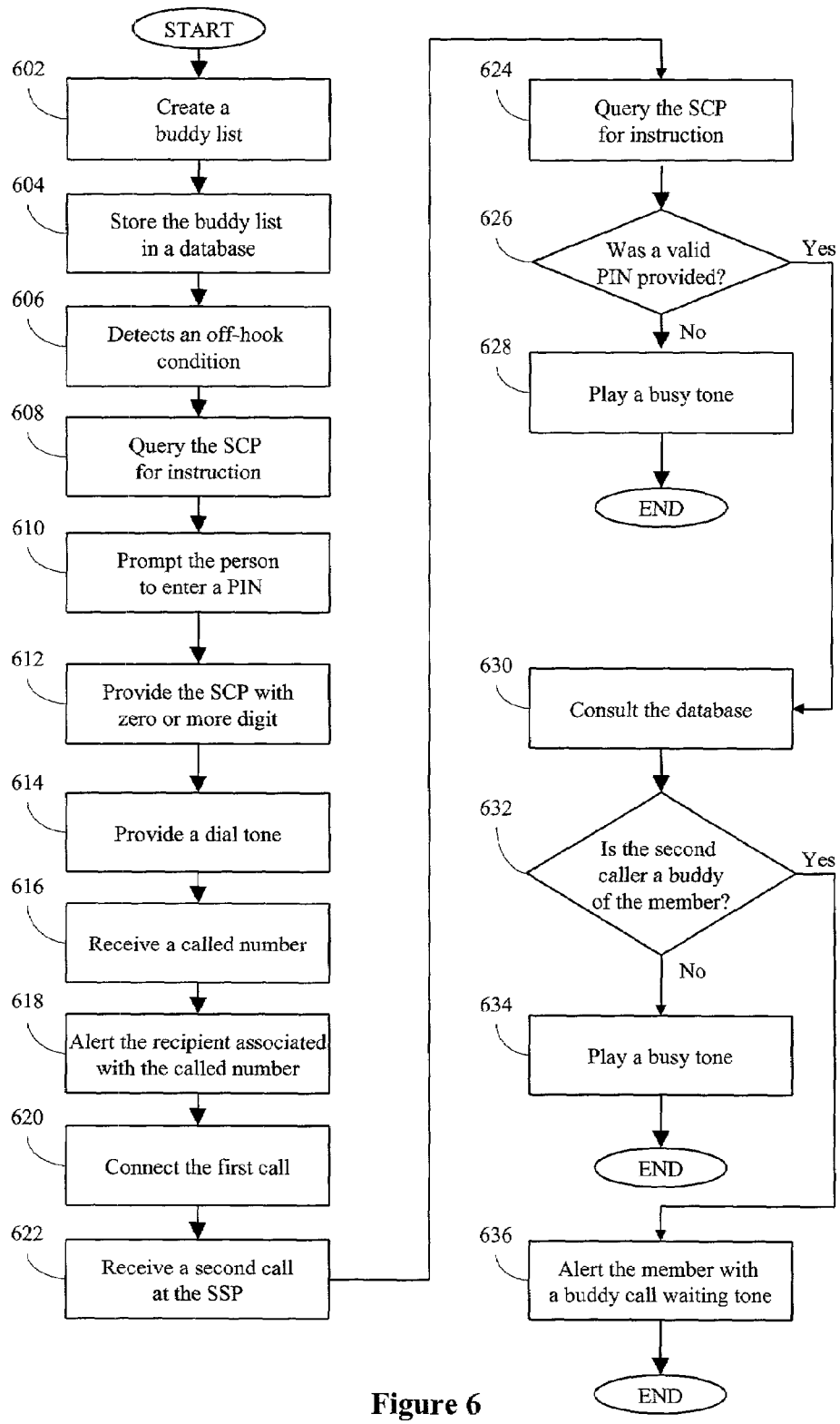
FIG. 6 is a flowchart illustrating the steps involved in using an alternative embodiment of the present invention that may be known as the Deluxe Buddy Call Waiting Service.

FIG. 6 is a flowchart illustrating the steps involved in using an alternative embodiment of the present invention that may be known as the Deluxe Buddy Call Waiting Service. In this alternative embodiment, a member of the subscriber may identify himself or herself to the system of the present invention before the member establishes a first call. When an incoming call (a second call) is received while the member is on the telephone, the member will be alerted if the caller is a buddy of the member. In other words, if the caller is not a buddy of the member who is engaged in the first call (originated by the member), the second call will not be alerted to the member.

Steps 602 and 604 are similar to corresponding steps 502 and 504 shown in FIG. 5 and described above. In step 606, a person starts to use telephone line 114, by lifting the handset of CPE 112. The lifting of the handset creates an off-hook condition for telephone line 114. The off-hook condition may, for example, be detected by trigger 122, an off-hook immediate trigger. As a result, SSP 116 may launch a query to SCP 140 in step 608. The query may be a TCAP query. For example, the query may be a Origination_Attempt query. The query may cause SCP 140 to send a response to SSP 116 in step 610. For example, the response may be a Send_To_Resource message.

The Send_To_Resource message may comprise an instruction for SSP 116 to prompt the person to enter a PIN in step 610. The Send_To_Resource message can specify how many digit to collect, or how the system should wait to collect the digits. After a predefined period of time, SSP 116 can send SCP 140 a Resource_Complete message in step 612. The Resource_Complete message comprises zero or more digit as entered by the person. After SCP 140 had received the Resource_Complete message from SSP 116, SCP 140 stored the zero or more digit as a flag. The flag may be known as a PIN flag. In step 614, SSP 116 can then provide a dial tone to telephone line 114.

In step 616, the person may dial a telephone number of an intended recipient (the called number). The recipient may be recipient 180 shown in FIG. 1. In step 618, recipient 180 may be alerted about the call from subscriber 110. For example, SSP 176 associated with telephone line 184 of recipient 180 may ring CPE 182. In step 620, when recipient 180 answers the call, a communication session for the first call between the person and recipient 180 is established, and telephone line 114 of subscriber 110 is engaged to facilitate the first call.

While the person is on the telephone with recipient 180, caller 160 may call and a second call for telephone line 114 is received at SSP 116 in step 622. The second call may be detected by trigger 120. Trigger 120 may be a terminating busy/no answer trigger. In step 624, SSP 116 launches a Terminating Busy/No Answer query to SCP 140.

In step 626, a determination is made at SCP 140 on whether a valid PIN was received in step 612. If no PIN was provided by the person or if the PIN received is not recognized by SCP 140, the identity of the person would not known to the system. Consequently, SSP 116 may play a busy tone for caller 160 in step 628, indicating that telephone line 114 is not available.

But if in step 626 it was determined that SCP 140 had received a valid PIN in step 612 indicating that the person is a member of subscriber 110, e.g., John Smith had entered "101", the process goes to step 630. With a valid PIN and information on the buddy list, the system knows the identity of the member who is using telephone line 114 to communicate with recipient 180 during the first call.

In step 630, SCP 140 consults database 142. Using the information in the Called_Party_ID field of the query, SCP 140 may access the buddy list of subscriber 110. For example, using "404-828-0000," SCP 180 can retrieve Table 7 shown above.

In step 632, SCP 140 may use the information in the Calling_Party_ID field of the query to determine whether caller 160 is a buddy of the member who is engaged in the first call with recipient 180. For example, if caller 160 is not a buddy of the member, SCP 140 will instruct SSP 116, via a response to the second query, to play a busy tone for caller 160 in step 634.

But if it is determined in step 632 that caller 160 is a buddy of the member, the process goes to step 636. For example, if the member who is on the first call is John Smith and caller 160 is Bo Bedingfield, who is a buddy of John, the process goes to step 636. In step 636, SCP 140 may instruct SSP 116 to play a buddy call waiting tone that is associated with the member. In the example in which John Smith is the member, Buddy Call Waiting Tone A is played by SSP 116 in step 640.

As it is understood by one skilled in the art, steps 606 through 624 may be different if trigger 120 is an off-hook delay trigger instead of an off-hook immediate trigger. If the off-hook delay trigger is used, the telephone number of recipient 180 (the called number) may be sent to SCP 140. SCP 140 may then review the buddy list to determine whose buddy is recipient 180. In that case, the use of a PIN may not be necessary.

Figure 7:
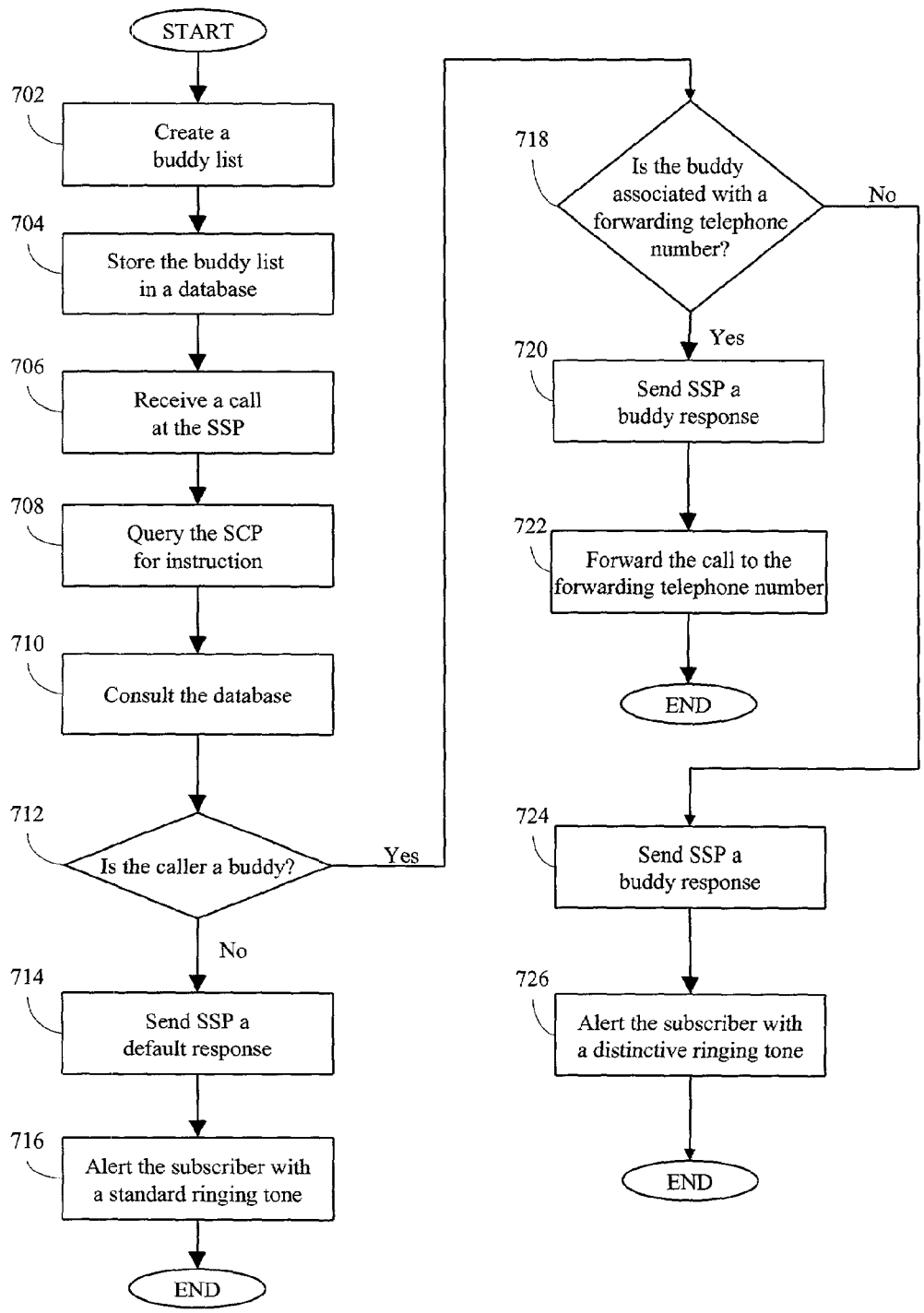
FIG. 7 is a flowchart illustrating the steps involved in using a fifth preferred embodiment of the present invention that may be known as the Buddy Call Forwarding Service.

FIG. 7 is a flowchart illustrating the steps involved in using the fifth preferred embodiment of the present invention that may be known as the Buddy Call Forwarding Service. Steps 702 through 716 may be similar to corresponding steps 202 through 216 shown in FIG. 2 and discussed above. However, the buddy list for this embodiment of this embodiment may contain additional information. An example of a buddy list for this embodiment is shown as Table 8.

TABLE 8

Buddy List of the Smith Family
(Subscriber Number 404-828-0000)

| Calling Party (Buddy) Number | Calling Party (Buddy) | Distinctive Ringing Tone | Forwarding Telephone Number |
|---|---|---|---|
| 404-821-1000 | Sammy Johnson | No. 1 | None |
| 770-529-1234 | Bo Bedingfield | No. 1 | None |
| 678-352-2121 | Mike Brown | No. 1 | None |
| 205-449-0000 | Mary Jo Jackson | No. 2 | None |
| 770-234-4545 | Rebecca Whitehead | No. 2 | None |
| 630-657-9012 | Irene Green | No. 2 | None |
| 704-449-0000 | Bob Jones | No. 3 | 213-313-4567 |
| 919-234-4545 | Freddie Cooper | No. 3 | None |
| 212-565-8902 | Jason Baker | No. 3 | None |

In step 718, when SCP 140 reviews the buddy list, SCP 140 also determines whether there is a forwarding telephone number associated with the buddy. If so, the process goes to 720. For example, if the Calling_Party_ID field of the query contains "704-449-0000", then the buddy number that matches the calling number would indicate that forwarding telephone number 213-313-4567 is associated with the buddy.

In step 720, SCP 140 sends SSP 116 a buddy response. The buddy response may be a Forward_Call message. The Forward_Call message can contain the forwarding telephone number in the Called_Party_ID field, replacing the subscriber number. For example, the message can contain the 213-313-4567 forwarding telephone number which is associated with telephone line 184.

But if in step 718 there is no forwarding telephone number associated with the buddy, e.g., caller 130 is a buddy other than Bob Jones, the process goes to step 724. In step 724, SCP 140 sends a buddy response to SSP 116. The buddy response can comprise a distinctive ringing tone. For example, if caller 130 is Irene Green, then Distinctive Ringing Tone No. 2 will be used to alert CPE 112, indicating that a buddy of Jane Smith is calling.

Figure 8:
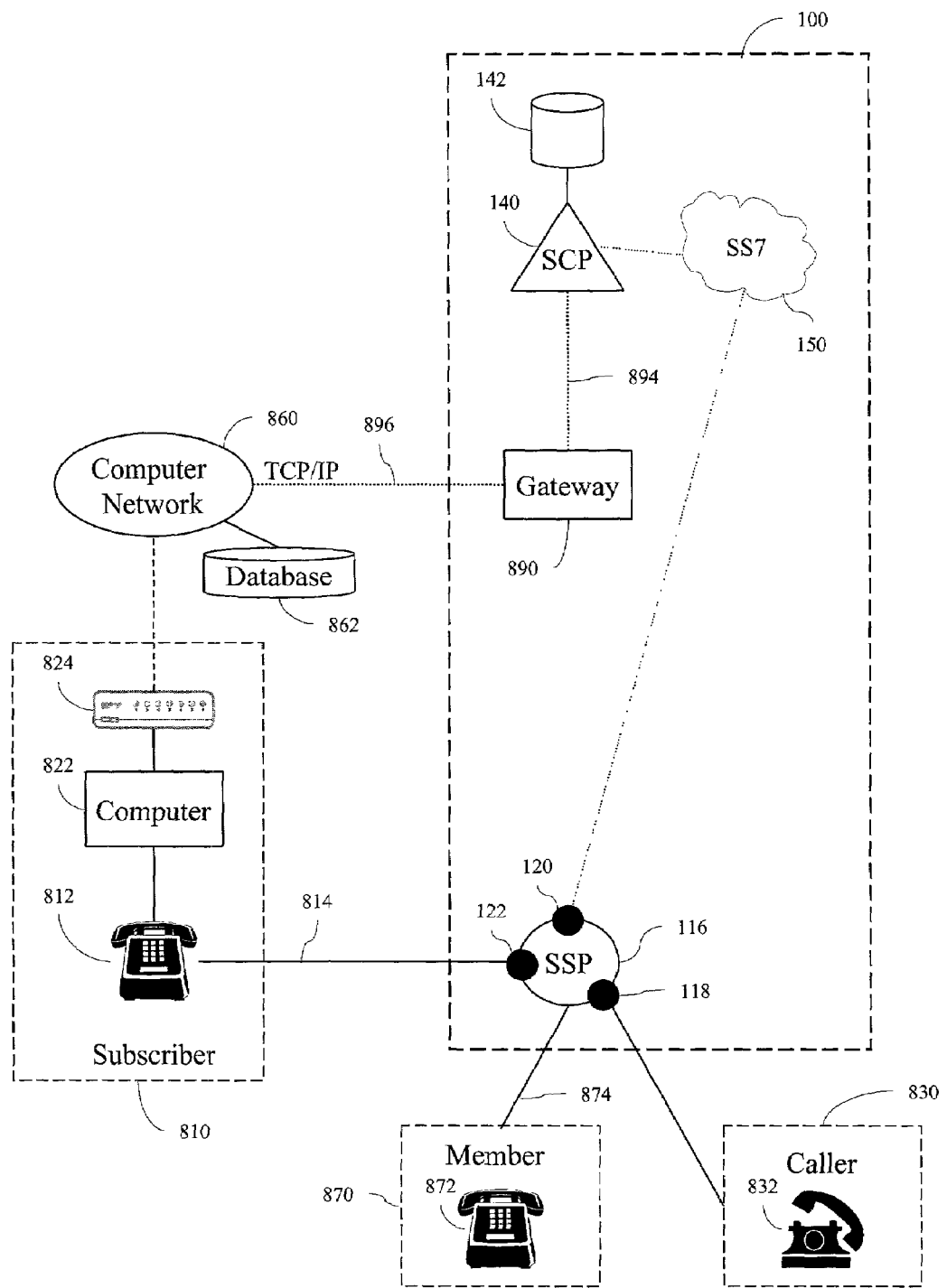
FIG. 8 is a schematic diagram showing another embodiment of the system architecture of the present invention.

FIG. 8 is a schematic diagram showing a preferred embodiment of the system architecture of the present invention. AIN 100 provides PTP services, including one or more embodiments described above. Gateway 890 provides a gateway function between SCP 140 of AIN 100 and computer network 860. Gateway 890 includes data links 894 and 896 connecting gateway 890 to SCP 140 and computer network 860, respectively. In a preferred embodiment, data link 896 uses the TCP/IP protocol.

Subscriber 810 is a user of the present invention. Subscriber 810 has CPE 812, computer 822, and modem 824. CPE 812 is connected to SSP 116 by telephone line 814. Triggers 118, 120, and 122 are provisioned at SSP 116 on telephone line 814. In a preferred embodiment, trigger 118 is a termination attempt trigger, trigger 120 is a termination busy no answer trigger, and trigger 122 may be an off-hook immediate or an off-hook delay trigger.

Subscriber 810 may use modem 824 and computer 822 to access computer network 860. Although not shown in FIG. 8, the communication session between computer 822 and computer network 860 may be established using one of several methods. One suitable method includes the use of telephone line 814 on a dial-up basis. Other suitable methods may involve dedicated communication links such as ISDN, T1, T3 or DSL lines. Computer network 860 may be the Internet. Computer network 860 preferably supports a plurality of protocols including, e.g., TCP/IP, and the like. Computer network 860 may also be a local area network accessible by both subscriber 810 and the service provider of the present invention. In a preferred embodiment, the telephone company that operates AIN 100 may be the service provider.

SSP 116 communicates with SCP 140 via signaling system 150. In a preferred embodiment, signaling system 150 can be the well-known SS7 system. SCP 140 can have database 142. Database 142 may be used to store subscriber information and service logic programs to implemented AIN-based services. One example of the subscriber information stored in database 142 is a subscriber list or a buddy list.

In this architecture, the individual components have the following functions. SSP 116 acts as the switch for subscriber 810, receiving incoming calls to subscriber 810, launching queries to SCP 140 (through signaling system 150), and routing the calls in accordance with responses received from SCP 140. SSP 116 is the access point through which caller 830 reaches subscriber 810. Caller 830 may dial the telephone number of subscriber 810 using CPE 832. Member 870 who is equipped with CPE 872 is member of subscriber 810. Member 870 may be contacted through telephone line 874. As would be apparent to one skilled in the art, SSP 116 could be one or more service switching points, located together or apart.

SCP 140 may be an AIN node that receives queries from SSP 116 via signaling system 150, consults database 142 for subscriber information, and issues call processing instructions to SSP 116. Database 142 can comprise the buddy list that is created in accordance with the present invention. Database 142 may also comprise records for subscribers' telephone numbers, the services subscribed to, and the IP address of gateway 890. Data may be manually input into database 142. A service management system (SMS) may also be used for inputting the data.

SCP 140 may send to and receive from subscriber 110 information via gateway 890 and computer network 860. Information stored in database 142 may also be stored in database 862. SCP 140 may retrieve information from databases 142 and/or 862 to process calls. Preferably, SCP 140 can access information in database 862 using TCP/IP through gateway 890.

Figure 9:
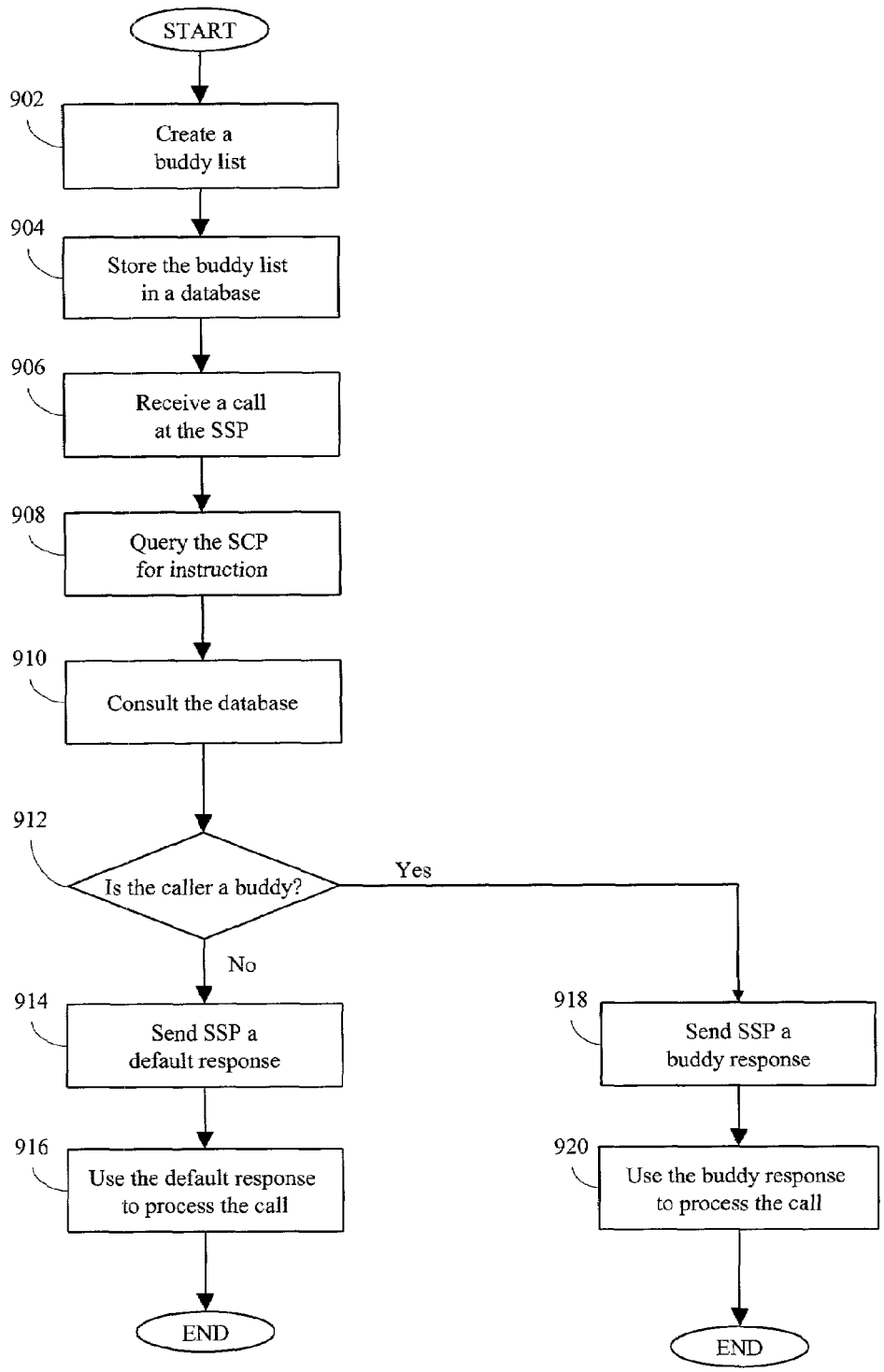
FIG. 9 is a flowchart illustrating the steps involved in using the embodiment of the present invention shown in FIG. 8.

FIG. 9 is a flowchart illustrating the steps involved in using the embodiment of the present invention shown in FIG. 8. In step 902, a buddy list for subscriber 810 is created. If subscriber 810 has three members, then the buddy list of subscriber 810 may be represented by Table 9 below. The first member of subscriber 810 is associated with Ringing Tone No. 1, Calling Tone A, and PIN 101. Similar, the second member of subscriber 810 is associated with Ringing Tone No. 2, Calling Tone B, and PIN 202. Finally, the third member of subscriber 810 is associated with Ringing Tone No. 3, Calling Tone B, and PIN 303.

TABLE 9

Buddy List of Subscriber 810
(Subscriber Number 123-456-7890)

| Calling Party (Buddy) Number | Forwarding Telephone Number | Distinctive Ringing Tone | Buddy Call Waiting Tone | Buddy Mailbox Number |
|---|---|---|---|---|
| 999-999-9999 | 777-777-7777 | No. 1 | A | 001 |
| 222-222-2222 | None | No. 1 | A | 001 |
| 333-333-3333 | 888-888-8888 | No. 2 | B | 002 |
| 444-444-4444 | None | No. 2 | B | 002 |
| 555-555-5555 | None | No. 3 | C | 003 |
| 666-666-6666 | None | No. 3 | C | 003 |

In step 904, the buddy list is stored in a database. The buddy list may be stored in database 862. A number of methods may be used to upload the buddy list. For example, subscriber 810 may upload the buddy list to database 862 using computer 822 and modem 824 via computer network 860. The buddy list may also be stored in database 142 using known methods. One known method of inputting the buddy list into database 142 is through an employee of the service provider. Using the system architecture shown in FIG. 8, it is understood that subscriber 810 may edit the buddy list at anytime. Subscriber 810 may edit the buddy list via, e.g., computer network 860.

In step 906, when caller 830 dials the telephone number of telephone line 814 (the subscriber number), the call is received at SSP 116. The incoming call intended for any member of subscriber 810 may be detected at SSP 116 by trigger 118 and/or trigger 120.

In step 908, as a result of the trigger detection in step 906, a query may be launched by SSP 116 to SCP 140. Preferably, the query is a TCAP query. The query can comprise subscriber and caller information. Information contained in the query may include the calling number (the telephone number of caller 830) and the subscriber number (the telephone number of subscriber 810).

In step 910, SCP 140 may consult one of the databases. For example, SCP 140 may consult its own database 142. Alternatively, AIN 140 may access database 862 via gateway 890 and computer network 860. Any suitable protocol may be used to facilitate the communication session that allows SCP 140 to review information in database 862. Preferably, the TCP/IP protocol is used.

In step 912, a determination is made as to whether caller 830 is a buddy of any member of subscriber 810. If caller 830 is not a buddy, the process goes to step 914. In step 914, SCP 140 can provide a default response to SSP 116. The default response may contain a default rule. In step 916, SSP 116 executes the default rule. For example, if the default rule instructs SSP 116 to terminate the call using a standard ringing tone, then CPE 812 of subscriber 810 would ring with the standard ringing tone.

But if in step 912 it is determined that caller 830 is a buddy, the process goes to step 918. In step 918, SCP 140 provides SSP 116 with a buddy response. The buddy response may comprise a buddy rule retrieved from the buddy list. The buddy rule may be an instruction for SSP 116 to terminate the call in accordance with the PTP services of the present invention. The buddy rule may be one or more of several instructions depending on the type PTP services subscribed to by subscriber 810. Examples of PTP services are described above in conjunction with FIGS. 2 to 7.

Figure 10:
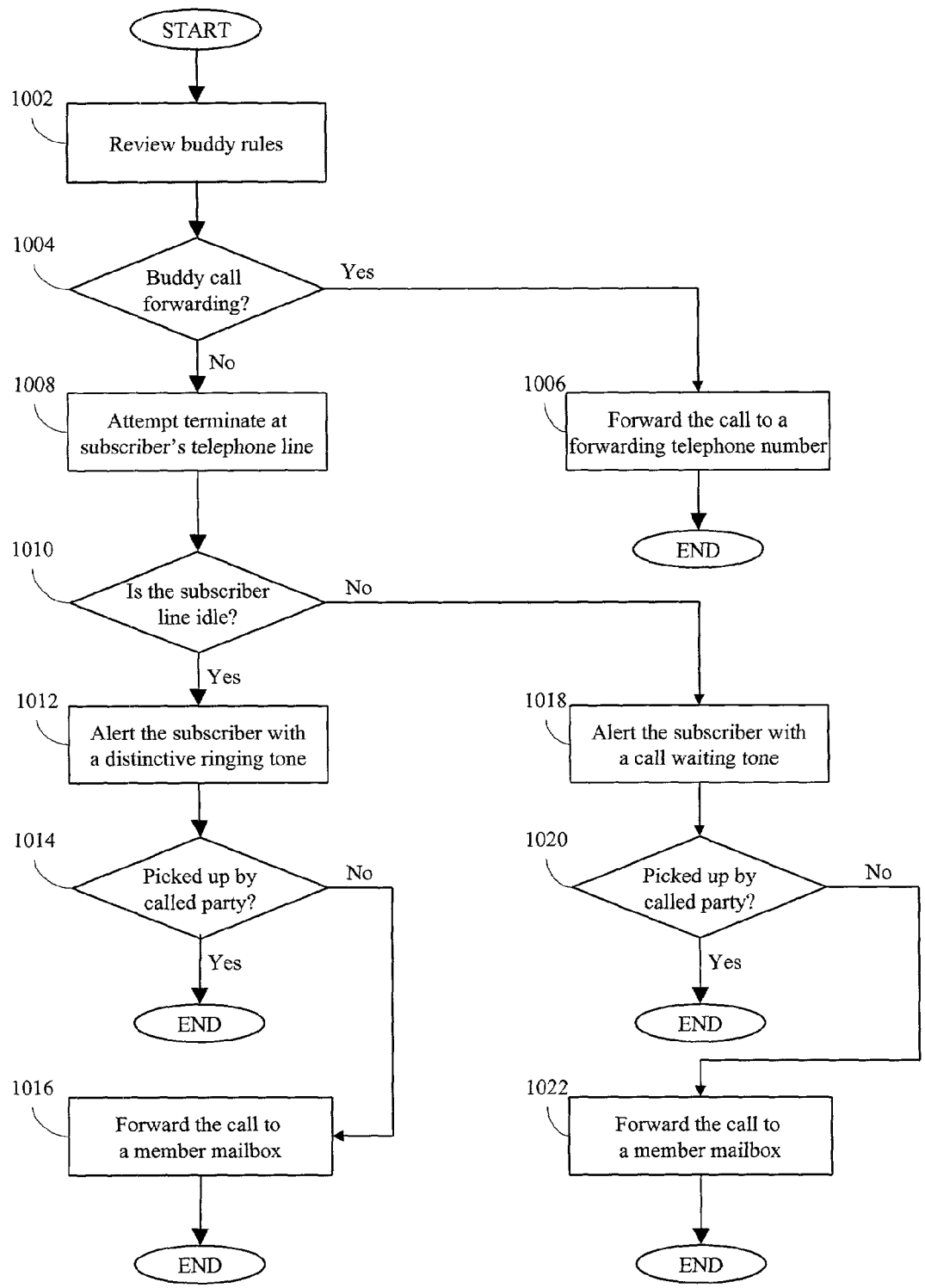
FIG. 10 is a flowchart illustrating the steps involved in processing a call intended for a subscriber of multiple features of the PTP services of the present invention.

FIG. 10 is a flowchart illustrating the steps involved in processing a call intended for a subscriber of multiple features of the PTP services of the present invention. For example, assume that subscriber 810 has subscribed to a number of PTP services including Buddy Ring, Buddy Mailbox, Buddy Call Waiting, and Buddy Call Forwarding, which are shown in FIGS. 2, 3, 4, and 7, respectively, and described above. As is understood to one skilled in the art, subscriber 810 may have subscriptions to other combinations of PTP services. Furthermore, available PTP services that can be implemented using the present invention are not limited to those specifically illustrated above.

Assume that caller 830 is a buddy of subscriber 810, and assume further than SSP 116 has launched a query to SCP 140. In other words, assume that the process has gone through steps 902 through 912 shown in FIG. 9 and discussed above. In step 1002, SCP 140 reviews the buddy list. For example, information in the "Forwarding Telephone Number" column of Table 9 may be reviewed in step 1002.

In step 1004, the process may take one of two paths depending on whether the calling number is associated with a forwarding telephone number on the buddy list. If so, the call is forwarded, in step 1006, to the forwarding telephone number. For example, if the calling number was 999-999-9999, then the call would be forwarded to telephone number 777-777-7777.

But if in step 1004 it is determined that the calling number is not associated with a forwarding telephone number, e.g., the calling number is neither 999-999-9999 nor 333-333-3333, then the call may be attempted to be terminated in step 1008. For example, SCP 140 may provide SSP 116 with an Authorize_Termination message for SSP to attempt call termination in step 1008.

In step 1010, depending on the busy/idle status of telephone line 814, the process may move on to either step 1012 or step 1018. If telephone line 814 is idle, the process goes to step 1012. In step 1012, SSP 116 rings CPE 812 with a distinctive buddy ringing tone that is associated with the calling number. For example, if the calling number is 222-222-2222, then the distinctive ringing tone is Distinctive Ringing Tone No. 1.

In step 1014, if someone picks up the call using CPE 812, the process ends. Otherwise, if no one picks up the call after it has rung for a specific period of time, the process goes to step 1016. In step 1016, the call is forwarded to a buddy mailbox that is associated with the calling number. For example, if the calling number is 222-222-2222, then the appropriate buddy mailbox to forward the call to is Buddy Mailbox No. 001.

But if in step 1010 telephone line 814 is determined to be busy, the process goes to step 1018. In step 1018, SSP 116 alerts whoever is one the telephone with a calling waiting tone. In step 1020, if the call is picked up, the process end. If no one picks up the call in step 1020 after a specific period of time, the process goes to step 1022. In step 1022, the call is forwarded to a buddy mailbox that is associated with the calling number. For example, if the calling number is 555-555-5555, then the appropriate buddy mailbox to forward the call to is Buddy Mailbox No. 003.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method of processing a call, comprising:

establishing a subscriber number that is shared amongst multiple subscribers;

receiving a trigger to detect the call;

querying a database for call services to be applied to the call, the query including a calling party's telephone number and the subscriber number, the database associating the calling party's telephone number and the subscriber number to multiple call services;

retrieving a buddy list associated with the subscriber number, the buddy list identifying buddy numbers for the multiple subscribers to the subscriber number, the buddy list associating at least one buddy rule to each buddy number;

if the calling party's telephone number is not found in the buddy list, then terminating the call according to a default rule for when the calling party is not a buddy;

if the calling party's telephone number is found in the buddy list, then querying for a buddy rule that applies a distinctive ringtone associated with the calling party's telephone number and with the subscriber number;

receiving a distinctive ringtone response having a ControllingLegTreatment field identifying the distinctive ringtone to be applied;

recording the distinctive ringtone that was played for the call;

querying for a mailbox number that indicates which of multiple voicemail boxes are associated with the calling party's telephone number and with the subscriber number;

receiving a mailbox response in which a CallingPartyID field is preceded by the mailbox number;

when the subscriber number has an idle status, then ringing a device of the subscriber number for a predetermined amount of time;

when the predetermined amount of time has passed without answer, then forwarding the call to the mailbox number;

receiving a second incoming call while the subscriber number is engaged in the call;

determining if a second calling party is a buddy of a subscriber engaged in the call by comparing the recorded distinctive ringtone and a second calling number;

when the second calling party is a buddy of the subscriber engaged in the call, then retrieving a distinctive call waiting tone to alert the subscriber engaged in the call of the buddy's incoming second call; and if, however, the second calling party is not the buddy of the subscriber engaged in the call, then declining to alert of the second incoming call.

2. The method according to claim 1, further comprising retrieving a personal identification number, the personal identification number indicating which of multiple members associated with the calling party's telephone number initiated the telephone call.

3. A system for processing a call, comprising:

means for establishing a subscriber number that is shared amongst multiple subscribers;

means for receiving a trigger to detect the call;

means for querying a database for call services to be applied to the call, the query including a calling party's telephone number and the subscriber number, the database associating the calling party's telephone number and the subscriber number to multiple call services;

means for retrieving a buddy list associated with the subscriber number, the buddy list identifying buddy numbers for the multiple subscribers to the subscriber number, the buddy list associating at least one buddy rule to each buddy number;

if the calling party's telephone number is not found in the buddy list, then means for terminating the call according to a default rule for when the calling party is not a buddy;

if the calling party's telephone number is found in the buddy list, then means for querying for a buddy rule that applies a distinctive ringtone associated with the calling party's telephone number and with the subscriber number;

means for receiving a distinctive ringtone response having a ControllingLegTreatment field identifying the distinctive ringtone to be applied;

means for recording the distinctive ringtone that was played for the call; means for querying for a mailbox number that indicates which of multiple voicemail boxes are associated with the calling party's telephone number and with the subscriber number;

means for receiving a mailbox response in which a CallingPartyID field is preceded by the mailbox number;

when the subscriber number has an idle status, then means for ringing a device of the subscriber number for a predetermined amount of time;

when the predetermined amount of time has passed without answer, then means for forwarding the call to the mailbox number;

means for receiving a second incoming call while the subscriber number is engaged in the call;

means for determining if a second calling party is a buddy of a subscriber engaged in the call by comparing the recorded distinctive ringtone and a second calling number, when the second calling party is a buddy of the subscriber engaged in the call, then means for retrieving a distinctive call waiting tone to alert the subscriber engaged in the call of the buddy's incoming second call; and if, however, the second calling party is not the buddy of the subscriber engaged in the call, then means for declining to alert of the second incoming call, 4. The system according to claim 3, further comprising means for retrieving a personal identification number indicating which of multiple members associated with the calling party's number initiated the call.

* * * * *